UNITED STATES PATENT OFFICE.

ALWIN MITTASCH, JOSEF JANNEK, AND GUSTAV WIETZEL, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

RECOVERY OF VALUABLE PRODUCTS FROM COAL GASES.

1,412,954.  Specification of Letters Patent.  Patented Apr. 18, 1922.

No Drawing.  Application filed August 27, 1921. Serial No. 496,136.

*To all whom it may concern:*

Be it known that we, ALWIN MITTASCH, JOSEF JANNEK, and GUSTAV WIETZEL, citizens of Germany, residing at Ludwigshafen-on-the-Rhine, Germany, have invented new and useful Improvements in the Recovery of Valuable Products from Coal Gases, (for which we have filed an application in Germany July 16, 1920,) of which the following is a specification.

The invention relates to the separation or production of valuable constituents from coal gases, for example benzene-hydrocarbons, sulfur, and if desired ethylene and other unsaturated aliphatic hyrocarbons or derivatives thereof, by means of charcoal. According to this invention, the order in which the said constituents are removed, is of great importance and it has proved most advantageous to separate the said substances in the order already mentioned, viz, first the benzene hydrocarbons, thereafter sulfur and finally ethylene hydrocarbons, if it be desired to remove them also. In either case the gases should be beforehand freed, either completely or else to a large extent, from tarry matter and cyanogen compounds, whereupon they are conveyed, at ordinary or slightly raised temperature, through a suitable number of tanks containing active charcoal by which the constituents desired are removed either by simple absorption or adsorption, or with the simultaneous effection of chemical or catalytic reactions as the case may be. The compounds taken up by the charcoal can be extracted or expelled therefrom at suitable intervals of time, the benzene hydrocarbons being, for example, expelled by means of steam, sulfur extracted with the aid of suitable solvents, such as ammonium sulfid solution, and the ethylene hydrocarbons again expelled with steam. Diminished pressure and heat applied to the charcoal may be resorted to in revivifying it.

The invention is more fully explained by the following example, but the invention is not limited to this special performance.

Towers of suitable height are supplied with a layer of granulated active charcoal (such as may be obtained by charring wood with an addition of zinc chlorid) through which towers the coal gas (from gas works or coke oven batteries) is passed with a proper velocity, after it has been freed from tar, cyanogen compounds and part of its ammonia contents. Before the gas enters into the tower in which the hydrogen sulfid is removed, a small quantity of air sufficient for the catalytic oxidation of the sulfureted hydrogen to sulfur is added and, if necessary, a small quantity of ammonia. When the efficiency of one of the towers becomes too low, the charcoal is revived and the desired product recovered simultaneously, care being taken, by a systematic connection of towers, particularly by an arrangement of exchangeable towers of the same kind, that the purification proceeds continuously. In the case of benzene as well as ethylene hydrocarbons very small quantities of water vapor will suffice for revivifying the charcoal. In most cases drying subsequently to the steaming, or extraction operation is preferable, to which end the charcoal may be treated with purified gas. It may be of advantage to employ, for the several absorption steps, different kinds of active charcoal, as may have proved most suitable for the respective purpose.

In the course of the process, ethylene and its homologues will first be absorbed by the nearest tower but they will be displaced by the benzene and benzene homologues which are more readily absorbed, subsequently they will be displaced from the next towers by the sulfur depositing there and finally they are retained in the last receptacles, from which they can be recovered in concentrated condition. An admixture of ammonia to the ethylene gas may be either avoided by washing the coal gas with aqueous sulfuric, or other, acid before the ethylene absorption, or else removed from the ethylene gases subsequently. The ethylene can also be converted into ethylene compounds by causing it to react with halogen or the like in the presence of active charcoal and the ethylene compounds can then be deposited in the charcoal itself or behind it. Organic compounds of sulfur contained in the coal gases are for the most part retained in the first receivers and must accordingly be separated from the benzene hydrocarbons recovered therefrom; hydrocyanic acid, if any is still present, is also absorbed together with the benzene hydrocarbons and will be converted into ammonium thiocyanate or like compounds. Sulfur may also be partly deposited in the first towers, owing to small traces of oxygen present, but it is of little importance as it will scarcely interfere with the absorption of benzene and can readily be removed periodically.

As the quantity of charcoal necessary for the removal of hydrogen sulfid from a given quantity of gas is considerably less than that required for the absorption of the benzene therefrom, a considerably smaller quantity of charcoal may either be taken for the step of removing sulfur or else the extraction in this case be effected at much greater intervals of time. Generally speaking, the absorption of benzene is exactly limited to the first receivers. In either case it is best to keep the contents of moisture rather low.

We claim:—

1. The process of recovering valuable products from coal gases which consists in passing the gas after it has been freed from tar and cyanogen compounds, through a number of receptacles supplied with active charcoal, first removing benzene hydrocarbons, then adding an oxygen containing gas to effect the oxidation of hydrogen sulfid to free sulfur which is precipitated in a following receptacle, the charcoal being revived by extracting or driving out the substances absorbed at required intervals.

2. The process of recovering valuable products from coal gases which consists in passing the gas after it has been freed from tar and cyanogen compounds, through a number of receptacles supplied with active charcoal, first removing benzene hydrocarbons, then adding an oxygen containing gas to effect the oxidation of hydrogen sulfid to free sulfur which is precipitated in a following receptacle and finally removing ethylene, the charcoal being revived by extracting or driving out the substances absorbed at required intervals.

3. The process of recovering valuable products from coal gases which consists in passing the gas after it has been freed from tar and cyanogen compounds, through a number of receptacles supplied with active charcoal, first removing benzene hydrocarbons, then adding a small amount of ammonia and an oxygen containing gas to effect the oxidation of hydrogen sulfid to free sulfur which is precipitated in a following receptacle and finally removing ethylene, the charcoal being revived by extracting or driving out the substances absorbed at required intervals.

In testimony whereof we have hereunto set our hands.

ALWIN MITTASCH.
JOSEF JANNEK.
GUSTAV WIETZEL.